Dec. 15, 1931.  W. F. HEROLD  1,836,246
CASTER
Filed Aug. 30, 1930   2 Sheets-Sheet 1
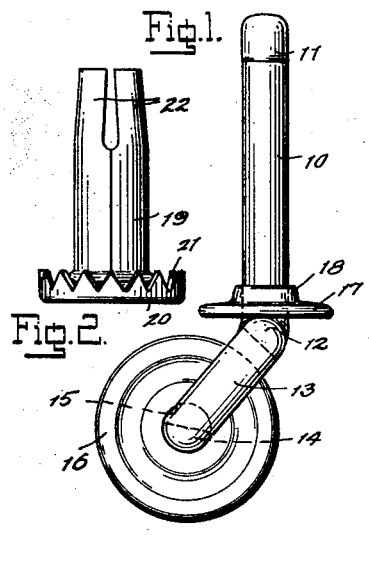
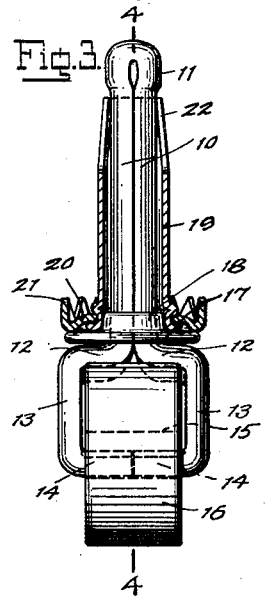
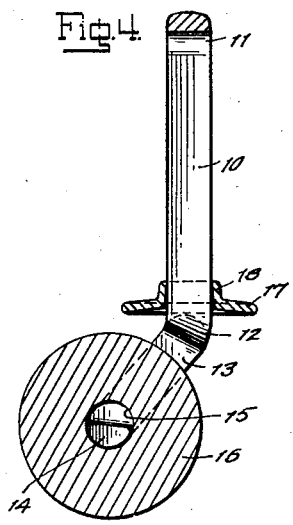
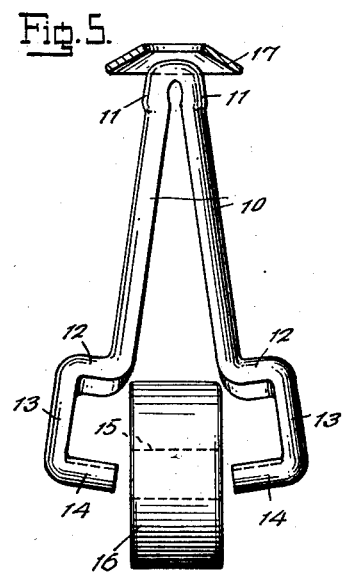
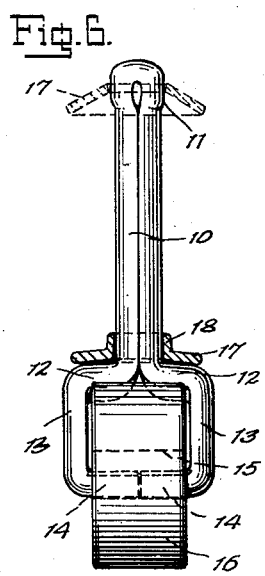
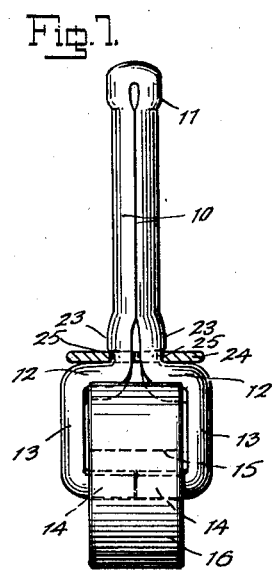
INVENTOR.
WALTER F. HEROLD
BY
ATTORNEY Dec. 15, 1931.  W. F. HEROLD  1,836,246
CASTER
Filed Aug. 30, 1930   2 Sheets-Sheet 2
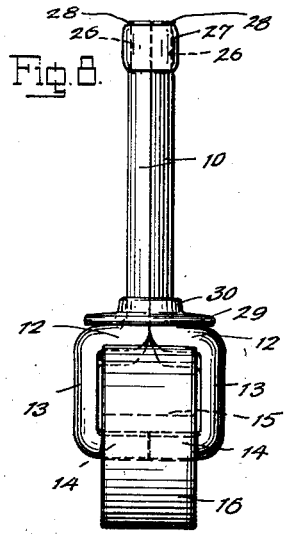
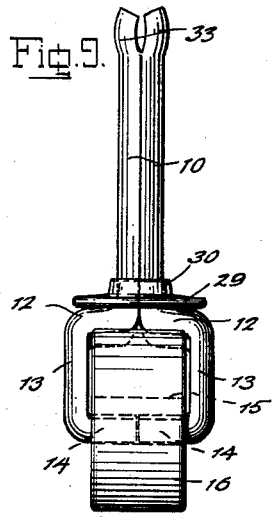
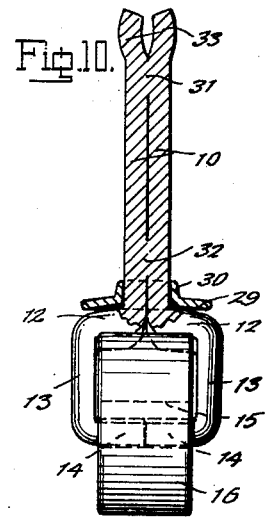
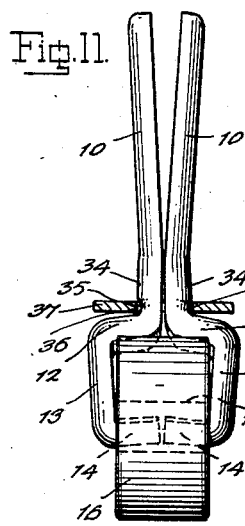
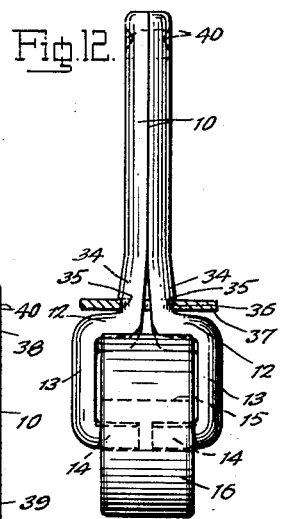
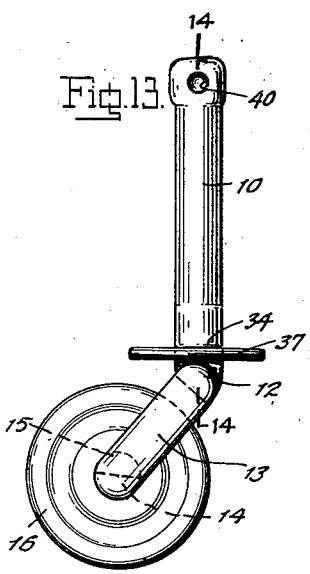
INVENTOR.
WALTER F. HEROLD.
BY
ATTORNEY Patented Dec. 15, 1931

1,836,246

UNITED STATES PATENT OFFICE

WALTER F. HEROLD, OF BRIDGEPORT, CONNECTICUT, ASSIGNOR TO THE BASSICK COMPANY, OF BRIDGEPORT, CONNECTICUT, A CORPORATION OF CONNECTICUT

CASTER

Application filed August 30, 1930. Serial No. 479,034.

The present invention relates to casters and has for an object to provide a caster of very simple and inexpensive construction, and which will be reliable and efficient in operation. It is particularly proposed to provide a combined and integrally formed pintle, yoke and axle structure adapted in the assembled relation to assemble and retain the caster wheel. It is further proposed in the illustrated embodiment to form the same from wire of semi-circular cross-section, adapted in the assembled relation to constitute a cylindrical pintle, and so disposed in its axle forming relation in the wheel as to provide a cylindrical bearing surface supporting the load.

With the above and other objects in view embodiments of the invention are shown in the accompanying drawings, and these embodiments will be hereinafter more fully described with reference thereto, and the invention will be finally pointed out in the claims.

In the drawings:

Fig. 1 is a side elevation of a caster, according to one embodiment of the invention.

Fig. 2 is a side elevation of a socket adapted to be employed with the caster.

Fig. 3 is a front elevation of the caster shown in Fig. 1, and showing the socket in vertical section engaged thereon.

Fig. 4 is a vertical sectional view taken along the line 4—4 of Fig. 3, the socket being removed.

Fig. 5 is a front elevation, showing the parts of the caster before assembly, the washer being shown in section.

Fig. 6 is a similar view showing the parts assembled, and showing in dotted lines the relation of the washer as it is engaged over the enlarged end of the pintle.

Fig. 7 is a front elevation, partially in cross-section, of a modified form of the invention.

Fig. 8 is a front elevation of another modification.

Fig. 9 is a front elevation of a further modification.

Fig. 10 is a vertical sectional view thereof.

Fig. 11 is a front elevation, partially in section, of a further modification before complete assembly of the parts.

Fig. 12 is a similar view showing the parts assembled by spot welding.

Fig. 13 is a side elevation of the same.

Fig. 14 is a vertical sectional view taken along the line 14—14 of Fig. 13.

Similar reference characters indicate corresponding parts throughout the several figures of the drawings.

Referring to the drawings, and more particularly to Figs. 1 to 6 thereof, the embodiment of the invention shown therein comprises a combined and integrally formed pintle, yoke, and axle, produced from a single piece of wire of semi-circular cross section. The wire is bent upon itself with the flat sides abutting to form the pintle 10, and at the bight the same is swaged, as at 11, to form a headed upper end for cooperation with the socket, as will presently more fully appear. At the lower end of the pintle the wire is bent outwardly, as at 12, to form the top of the yoke, and then bent downwardly at an angle, as at 13, to form the sides of the yoke. The axle is formed by bending the extremities of the wire inwardly, as at 14, the line of bending being slightly diagonal so that in the upright operative position the semi-cylindrical surface is disposed in such relation in the central bearing hole 15 of the wheel 16 as to form a full bearing surface supporting the load. The parts are adapted to be held in assembled relation by means of a bearing washer 17, snugly engaged over the lower end of the pintle, and having a flange 18 for engaging within the socket.

The socket illustrated is of the so-called grip-neck type comprising a tube 19 having a base plate 20 secured at its lower end, this plate being provided with a pronged flange 21 for driving into the under surface of a drilled leg, the upper end of the tube being split at diametrically opposed points and bent inwardly to form pintle retaining spring portions 22, adapted to be spread by the head of the pintle during insertion, and to engage beneath the head after insertion to retain the pintle.

In Figs. 5 and 6 I have shown the preferred manner of assembling the parts. The two sides of the combined pintle, yoke and axle are bent outwardly at the fold so that the ends of the axle are sufficiently separated to admit the wheel between them, as shown in Fig. 5. The washer, which before assembly is cone-shaped and has an opening large enough to pass over the head 11, is forced downwardly over the pintle, bringing the two sides of the pintle and the yoke and axle portions together, as shown in Fig. 6, the washer being flattened and flanged during this operation, so that its opening is reduced and snugly fits the pintle.

In Fig. 7 I have shown a modification in which the two pintle forming portions are provided at their lower ends with outwardly bent enlargements 23, the flat washer 24 having an opening of sufficient size to pass over the head 11 and to fit snugly over said enlargements. Slight indentations 25 are formed in the enlargements, in which the washer rests, the inherent resiliency of the metal causing the indented portions to spring out into snug interlocking engagement with the opening of the washer, after the latter has passed over the portion of the enlargements above the indentations.

In Fig. 8 I have shown another modification, in which the two half sections of the caster are formed separately, instead of being connected by the fold at the top as shown in the first embodiment. The pintle forming portions 10 are slightly reduced at their upper ends as at 26 and are engaged by a collar 27, secured by swaging over the upper extremity of the pintle, as at 28. The collar serves both to retain the two halves of the device together, and to constitute an enlarged head for cooperation with the socket, and for this purpose the outer surface of the collar is preferably rounded, as shown, to facilitate engagement with and disengagement from the socket. A bottom bearing washer 29 having a flange 30 is engaged with the lower end of the pintle and cooperates with the collar to retain the parts together.

In Figs. 9 and 10 I have shown a further modification in which the two half-sections of the caster are formed separately and are connected together by spot-welding, as at 31 and 32, near the upper and lower ends of the pintle forming portions 10. The upper end portions of the portions 10 are bent outwardly, as at 33, to form an enlargement for cooperation with the socket. A flanged bearing washer 29 similar to that shown in Fig. 8 is engaged with the lower end of the pintle.

In Figs. 11 to 14 I have shown a still further modification, in which the two half-sections of the caster are formed separately, and near their lower ends the pintle forming portions 10 are bent outwardly at a slight angle to form enlargements 34. Indentations 35 are formed at the lower ends of said enlargements. The opening 36 of the washer 37 is of such size that it will pass over the enlargements 34 when the inner flat surfaces contiguous to the enlargements are brought together, as shown in Fig. 11. Upon bringing the upper portions of the pintle together, as shown in Fig. 12, the enlargements are separated, so that the washer becomes snugly engaged in the indentations 35, and thereupon the two parts of the pintle are secured together by spot-welding, as at 38 and 39, the weld 38 being at the upper end and the weld 39 adjacent the enlargements. During the welding at 38 the metal is spread by indenting, as at 40, so that an enlargement is formed for cooperation with the socket.

I have illustrated and described preferred and satisfactory embodiments of the invention, but it will be obvious that changes may be made therein within the spirit and scope thereof, as defined in the appended claims.

Having thus described my invention, what I claim and desire to secure by Letters Patent is:—

1. In a caster, a pintle portion, and a yoke portion, axle means of semi-circular cross-section having the rounded convex surface downwardly disposed, and a wheel mounted on said axle means.

2. In a caster, a pintle portion, and a yoke portion integrally formed of a length of material of semi-circular cross-section and constituting one side of a complete pintle and yoke, a complementary pintle portion, and yoke portion, also integrally formed of a length of material of semi-circular cross-section and constituting the other side, said pintle portions forming a cylindrical pintle in assembled relation, axle means, and a wheel mounted on said axle means.

3. In a caster, a pintle portion, a yoke portion, and an axle portion, integrally formed of a length of material of semi-circular cross-section, and constituting one side of a complete pintle, yoke and axle, a complementary pintle portion, yoke portion and axle portion, also integrally formed of a length of material of semi-circular cross-section and constituting the other side, said pintle portions forming a cylindrical pintle in assembled relation and said axle portions having their rounded surfaces downwardly disposed, and a wheel mounted on said axle portions.

4. In a caster, a pintle and a yoke comprising a single length of material centrally bent upon itself to provide a pintle, the bight being at the upper end of said pintle, and the material at the lower end of said pintle being bent outwardly and downwardly to form a yoke, axle means, and a wheel mounted on said axle means.

5. In a caster, a pintle and a yoke comprising a single length of material centrally bent upon itself to provide a pintle, the bight being at the upper end of said pintle, and the material at the lower end of said pintle being bent outwardly and downwardly to form a yoke, a washer engaged with the lower end of said pintle adapted to maintain the operative relation of the two sides of said pintle and yoke.

6. In a caster, a pintle, yoke and axle comprising a single length of material of semi-circular cross-section, bent upon itself to provide a cylindrical pintle, the bight being at the upper end of said pintle, the material at the lower end of said pintle being bent outwardly and downwardly to form a yoke and inwardly to form an axle, the axle so arranged that the rounded convex surface is disposed downwardly and a wheel mounted on said axle.

7. In a caster, a pintle, yoke and axle comprising a single length of material of semi-circular cross-section, bent upon itself to provide a cylindrical pintle, the bight being at the upper end of said pintle, and the material at the lower end of said pintle being bent outwardly and downwardly to form a yoke and inwardly to form an axle, the axle so arranged that the rounded convex surface is disposed downwardly, a wheel mounted on said axle, and a washer engaged with the lower end of said pintle adapted to maintain the operative relation of the two sides of said pintle, yoke and axle.

8. In a caster, a wheel having a center hole, and two complementary sections, each forming half of a pintle, yoke and axle, said sections adapted in their separated relation to admit said wheel between the ends of said axle sections and in their assembled relation to assemble said wheel through engagement of said axle sections in said center hole of the wheel, a collar engaged with the upper ends of said pintle sections, and a washer engaged with the lower ends, said collar and washer adapted to maintain the assembled relation of said sections.

9. In a caster, a wheel having a center hole, and two complementary sections, each forming half of a pintle, yoke and axle, said sections adapted in their separated relation to admit said wheel between the ends of said axle sections and in their assembled relation to assemble said wheel through engagement of said axle sections in said center hole of the wheel, said sections being secured in assembled relation by welding.

Signed at Bridgeport, county of Fairfield, and State of Connecticut, this 22nd day of August, 1930.

WALTER F. HEROLD.